(12) United States Patent
Brown et al.

(10) Patent No.: US 8,725,218 B2
(45) Date of Patent: May 13, 2014

(54) MULTIMODE OPERATION DC-DC CONVERTER

(75) Inventors: James E. C. Brown, San Jose, CA (US); Daniel Dobkin, Sunnyvale, CA (US); Pablo Moreno Galbis, Palo Alto, CA (US); Cory Severson, Coarsegold, CA (US); Lawrence M. Burns, Los Altos, CA (US)

(73) Assignee: R2 Semiconductor, Inc., Sunnyvale, CA (US)

( * ) Notice: Subject to any disclaimer, the term of this patent is extended or adjusted under 35 U.S.C. 154(b) by 0 days.

(21) Appl. No.: 13/400,048

(22) Filed: Feb. 18, 2012

(65) Prior Publication Data

US 2012/0244916 A1 Sep. 27, 2012

Related U.S. Application Data

(60) Provisional application No. 61/467,900, filed on Mar. 25, 2011.

(51) Int. Cl.
H04B 1/38 (2006.01)
(52) U.S. Cl.
USPC .............. 455/571; 455/114.2; 455/127.1; 455/91; 455/126; 455/102; 455/103; 455/108; 455/116; 330/334; 330/124 R; 323/225; 323/274; 323/284
(58) Field of Classification Search
USPC ............ 455/114.2, 127.1, 91, 126, 102, 103, 455/108, 116, 571; 330/134, 124 R; 323/223
See application file for complete search history.

(56) References Cited

U.S. PATENT DOCUMENTS

| | | |
|---|---|---|
| 4,479,174 A | 10/1984 | Cates |
| 4,541,041 A | 9/1985 | Park et al. |
| 4,634,956 A | 1/1987 | Davis et al. |
| 4,884,183 A | 11/1989 | Sable |
| 5,028,861 A | 7/1991 | Pace et al. |
| 5,170,333 A | 12/1992 | Niwayama |
| 5,481,178 A | 1/1996 | Wilcox et al. |
| 5,994,885 A | 11/1999 | Wilcox et al. |
| 6,304,066 B1 | 10/2001 | Wilcox et al. |
| 6,433,525 B2 | 8/2002 | Muratov et al. |
| 6,580,258 B2 | 6/2003 | Wilcox et al. |
| 6,608,536 B2 | 8/2003 | Fallahi |
| 6,937,094 B2 | 8/2005 | Khanifar et al. |
| 7,043,213 B2 | 5/2006 | Robinson et al. |
| 7,132,891 B1 | 11/2006 | Dening et al. |

(Continued)

OTHER PUBLICATIONS

Notification of Transmittal of the International Search Report and Written Opinion of the International Searching Authority, International Application No. PCT/US2012/030014, International Filing Date Mar. 21, 2012.

(Continued)

Primary Examiner — Junpeng Chen
(74) Attorney, Agent, or Firm — Brian R. Short

(57) ABSTRACT

Embodiments for at methods, apparatus and systems for operating a voltage regulator are disclosed. One method includes generating, by a switching controller, a switching voltage through controlled closing and opening of a series switch element and a shunt switch element. Further, the method includes generating, by a switchable output filter, a regulated output voltage by filtering the switching voltage, wherein the switchable output filter comprises a plurality of capacitors that are selectively included within the switchable output filter.

23 Claims, 7 Drawing Sheets

(56) References Cited

U.S. PATENT DOCUMENTS

| | | | |
|---|---|---|---|
| 7,400,865 | B2 | 7/2008 | Järvinen |
| 7,454,238 | B2 | 11/2008 | Vinayak et al. |
| 7,466,195 | B2 | 12/2008 | Drogi et al. |
| 7,482,869 | B2 | 1/2009 | Wilson |
| 7,570,931 | B2 | 8/2009 | McCallister et al. |
| 7,907,920 | B2 | 3/2011 | Chan et al. |
| 2003/0090339 | A1 | 5/2003 | Yu et al. |
| 2004/0174152 | A1 | 9/2004 | Hwang et al. |
| 2006/0178119 | A1* | 8/2006 | Jarvinen .............. 455/114.2 |
| 2010/0233977 | A1 | 9/2010 | Minnis et al. |
| 2012/0043947 | A1 | 2/2012 | Wilson |

OTHER PUBLICATIONS

Anderson et. al. "High-Efficiency High-Level Modulator for Use in Dynamic Envelope Tracking CDMA RF Power Amplifiers" 2001 IEEE MTT International Microwave Symposium p. 1509.

Cidronali et. al. "A 1-bit Dynamically Biased Power Amplifier for Step Envelope Tracking Transmitters" Proc 39th European Microwave Conference p. 334 (2009).

Hanington et al., "High-Efficiency Power Amplifier Using Dynamic Power-Supply Voltage for CDMA Applications", IEE Trans. Microwave Theory and Techniques, v 47, p. 1471 (1999).

Hoyerby et. al. "Envelope Tracking Power Supply with fully controlled 4th order Output Filter" APEC 2006 p. 993.

Huang et. al. "Dithering Skip Modulator with a Novel Load Sensor for Ultra-wide-load High-Efficiency DC-DC Converters" ISLPED 2006.

Kapat et. al., "Modeling and Analysis of DC-DC Converters Under Pulse Skipping Modulation",Santanu Kapat, Soumitro Banerjee, Senior Member, IEEE, and Amit Patra, Member, IEEE Department of Electrical Engineering, Indian Institute of Technology, Kharagpur—721302, India.

Khanifar et. al. "Enhancement of Power Amplifier Efficiency Through Dynamic Bias Switching" 2004 IEEE MTT International Microwave Symposium p. 2047.

Lopez et. al. "Design of Highly Efficient Wideband RF Polar Transmitters Using the Envelope-Tracking Technique" IEEE J. Solid-State Circuits v. 44 p. 2276 (2009).

Sahu et. al. "A High-Efficiency Linear RF Power Amplifier with a Power-Tracking Dynamically Adaptive Buck-Boost Supply" IEEE Trans Microwave Theory and Techniques v 52 #1, p. 112 (2004).

Staudinger et. al. "High Efficiency CDMA RF Power Amplifier Using Dynamic Envelope Tracking Technique" 2001 IEEE MTT International Microwave Symposium.

Suguhara et. al. "Low Power Consumption and High Power Density Integrated DC-DC Converter for Portable Equipments" IEEE Asian Solid-State Circuits Cofnerence 2008 paper 5-2.

Takahashi et. al. "An Envelope Tracking Power Amplifier using an Adaptive Biased Envelope Amplifier for WCDMA Handsets" 2008 Radio Frequency Integrated Circuit Conference, p. 405.

Wang et. al. "A Monolithic High-Efficiency 2.4-GHz 20-dBm SiGe BiCMOS Envelope-Tracking OFDM Power Amplifier" IEEE J. Solid-State Ckts v 42 #6 p. 1271 (2007).

Warembourg "A DC/DC Converter for ISDN Terminals" INTELEC 1987 p. 76.

Rodriguez et. al. "Multilevel converter for Envelope Tracking in RF power amplifiers" M. Rodriguez, P. Miaja, A. Rodriguez and J. Sebastian ECCE 2009. p. 503.

Senanayake et. al. "Fast-Response Load Regulation of DC-DC Converter by Means of Reactance Switching" Power Electronics Specialist Conference 2003 p. 1157.

\* cited by examiner

MULTIMODE OPERATION DC-DC CONVERTER

RELATED APPLICATION

The patent application claims priority to U.S. provisional patent application Ser. No. 61/467,900, filed Mar. 25, 2011 which is herein incorporated.

FIELD OF THE DESCRIBED EMBODIMENTS

The described embodiments relate generally to power conversion. More particularly, the described embodiments relate to systems, methods and apparatus for a voltage regulator that is operable in multiple modes.

BACKGROUND

Switched-mode power converters are widely used to convert between differing DC voltages. A typical example of a buck converter (used to provide a reduced voltage from a higher-voltage supply) is shown in FIG. 1.

Transistor switches are used to alternately connect an inductor to a supply voltage and ground, at a switching frequency, $f_{sw}$. The output of the inductor is connected to a load.

In some applications, the target output voltage of a given converter is fixed during its useful life. In other applications, the target output voltage may be changed. For example, in the case where a DC-DC converter is employed to provide power for the output amplifier of a wireless transmitter, it is well-known that improved overall system efficiency can be obtained if the converter output voltage is varied depending on the radio frequency power to be transmitted. The benefits of this procedure vary widely depending on the nature of the wireless signal to be transmitted. For example, signals used in cellular communications based on code-division multiple access (CDMA) use intentional control of average transmit power at each mobile station to ensure roughly equal received power at the basestation. In order to ensure this result, the transmitted power in a mobile station (a phone, handheld device, or data modem) is adjusted periodically. In many standards, this adjustment takes place at the beginning of a transmission "slot", a fixed time period in which a fixed number of symbols are sent. For example, in WCDMA continuous transmission, average transmit power is changed at the beginning of each 667-microsecond slot. In order to optimize overall system efficiency, the supply voltage delivered to the transmit power amplifier may be similarly adjusted at the beginning of each slot. This adjustment may be accomplished using a linear regulator, but better system efficiency can be obtained with a switched-mode converter.

In modern wireless standards in which multiple streams of data are simultaneously sent using either code-division or orthogonal frequency division multiplexing (OFDM), the instantaneous amplitude of the transmitted signal varies considerably from one symbol to the next. Further efficiency improvements can be obtained if the supply voltage is similarly adjusted on a symbol-by-symbol basis; this mode of operation is known as Envelope Tracking. Envelope Tracking requires very rapid adjustments in the power amplifier supply voltage; in the WCDMA standard, the symbol duration is (1/3.84) microseconds, and the envelope of each symbol may vary in an uncorrelated, pseudo-random fashion when multiple coded streams are simultaneously transmitted. Undue delay or tracking errors in the supply may lead to distorted symbols, resulting in spurious output frequencies, and increases in the Error Vector Magnitude (EVM) of the transmitted signal. Envelope Tracking of such high-speed signals has usually been performed using linear regulators, or a linear regulator in combination with a switched-mode converter, because low-switching-frequency converters cannot provide the rapid response required for Envelope Tracking applications.

In the case where a power-controlled mobile station is reasonably dose to a basestation, very small transmit power may be sufficient to provide low bit error rates while minimizing interference. For example, it is known that when voice is being transmitted, a CDMA or WCDMA mobile station transmit power is most often adjusted to less than 10 mW, and frequently less than 1 mW, with only rare excursions to transmitted power greater than 100 mW. When the transmitted power is small, envelope tracking provides minimal benefits in total power consumed. However, switched converters are very inefficient at low power levels because of the substantial fixed overhead of switching power and controller power. It is well-known that substantial improvements in converter efficiency may be obtained in this case by making the switching transistors inactive for a period of time, allowing the load to discharge a storage capacitor until the output voltage drops to a voltage below the minimum desired. This form of operation is variously known as hysteretic control, pulse skipping, burst mode, or pulse frequency modulation.

It is desirable to have methods and apparatuses for voltage regulation that provides both high bandwidth/high power and low bandwidth/low power regulated voltages.

SUMMARY

An embodiment includes a switching voltage regulator. The switching voltage regulator includes a series switch element, a shunt switch element, a switching controller and a switched output filter. The switching controller is configured to generate a switching voltage through controlled closing and opening of the series switch element and the shunt switch element. The switched output filter filters the switching voltage and generates a regulated output voltage, wherein the switched output filter includes a plurality of capacitors that are selectively included within the switched output filter.

Another embodiment includes a method of operating a voltage regulator. The method includes generating, by a switching controller, a switching voltage through controlled closing and opening of a series switch element and a shunt switch element. Further, the method includes generating, by a switchable output filter, a regulated output voltage by filtering the switching voltage, wherein the switchable output filter comprises a plurality of capacitors that are selectively included within the switchable output filter.

Another embodiment includes a mobile device. The mobile device includes a transmitter for transmitting communications signals, a power amplifier for amplifying the communications signals before transmission, and a multiple mode switching voltage regulator for providing a regulated voltage to the power amplifier. The multiple mode switching voltage regulator includes a series switch element, a shunt switch element, a switching controller configured to generate a switching voltage through controlled closing and opening of the series switch element and the shunt switch element, and a switched output filter for filtering the switching voltage and generating a regulated output voltage, wherein the switched output filter comprises a plurality of capacitors that are selectively included within the switched output filter.

Other aspects and advantages of the described embodiments will become apparent from the following detailed description, taken in conjunction with the accompanying drawings, illustrating by way of example the principles of the described embodiments.

DETAILED DESCRIPTION

The described embodiments provide examples of implementations of voltage regulators that include multiple modes of operation. Exemplary modes include an envelope tracking mode (ETM) and a pulse skipping mode (PSM). The two modes can generally be described as high-bandwidth and low-bandwidth modes. For the ETM, the output of the voltage regulator can change substantially faster than it can for the PSM.

Some power supply implementations support only one or two of the modes of operation. Switched-mode power supplies suitable for envelope tracking may not be optimized for low-power operation. Highly-efficient hysterically switched low-power supplies vary in frequency when load varies, leading to undesired spurious transmitted signals. The described embodiments support all three modes (that is, for example, the ETM (envelope tracking mode), the PSM (pulse skipping mode), and a pulse width modulation (PWM) mode) of operation from a single switched-mode converter, with the mode of operation being adaptively adjusted to provide the best performance for a given operating condition.

An embodiment of a switched-mode regulator or power supply may be required to have a large value of output capacitance (for example, 2 or more microfarads) for proper operation while in a pulse skipping mode. However, it may not be possible to also support a high-frequency mode (such as, an envelope tracking mode) with this high-value of capacitance at the output of the switched-mode regulator. The described embodiments include voltage regulators that include modes that support both the high capacitance needed for a low bandwidth pulse skipping mode, and the high bandwidth (fast changing) output needed for an envelope tracking mode.

Figure 1:
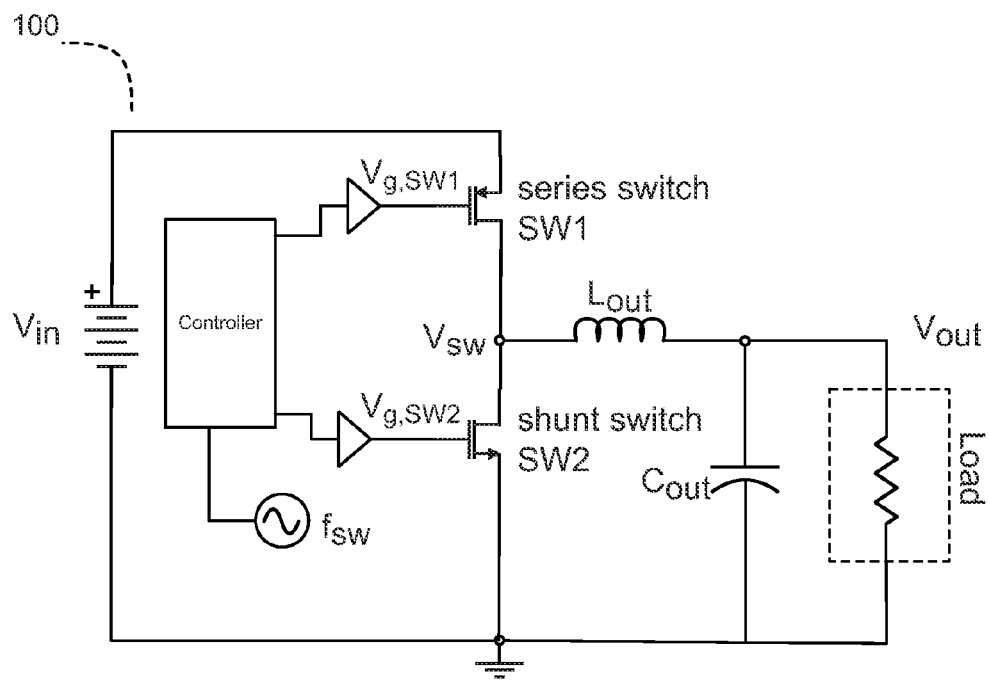
FIG. 1 shows an example of a prior art voltage regulator.
Figure 2:
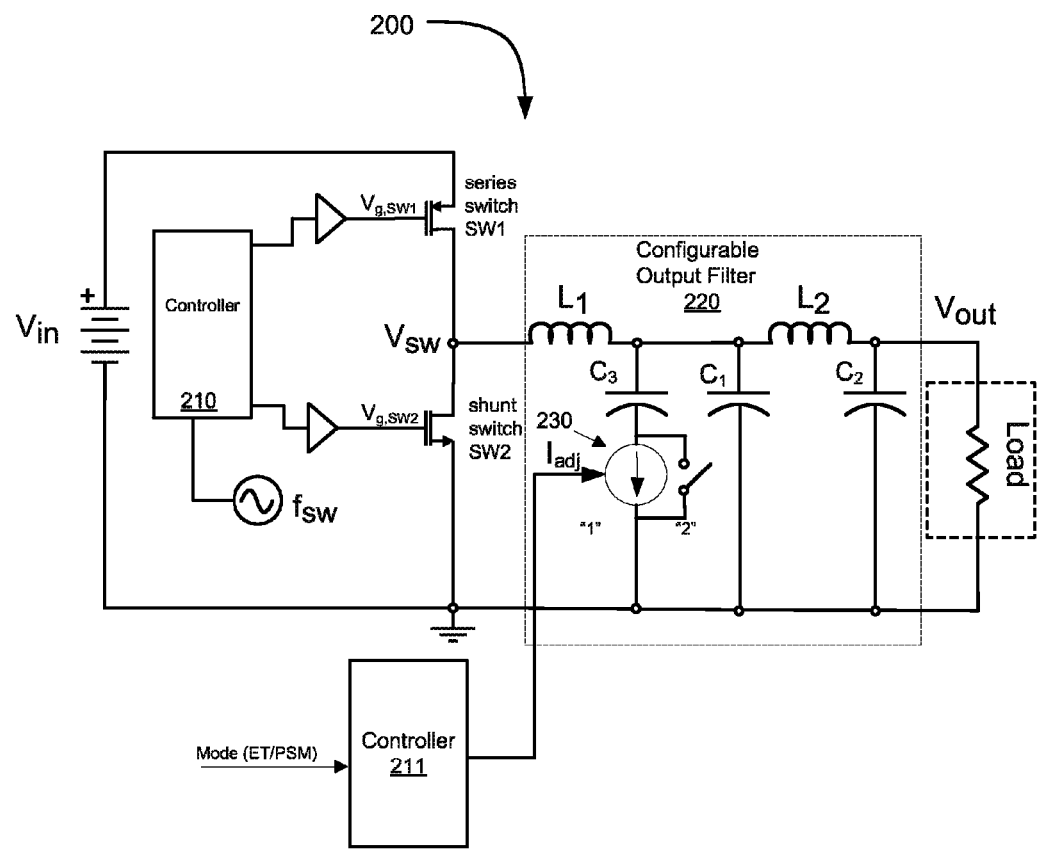
FIG. 2 shows an example of a multiple mode voltage regulator according to an embodiment.

FIG. 2 shows an example of a multiple mode switching voltage regulator 200 according to an embodiment. The switching voltage regulator 200 includes a series switch element (SW1), a shunt switch element (SW2), a switching controller 210, and a switched output filter 220. For at least one embodiment, the switching controller 210 is configured to generate a switching voltage through controlled closing and opening of the series switch element (SW1) and the shunt switch element (SW2). For at least one embodiment, the switched output filter 220 filters the switching voltage and generates a regulated output voltage, wherein the switched output filter 220 includes a plurality of capacitors (such as, capacitors $C_3$ and $C_1$, and optionally, $C_2$) that are selectively included within the switched output filter 220. The capacitive value of C3 is substantially larger than C1. C3 is utilized during the pulse skipping mode of the multiple mode switching voltage regulator 200.

As shown in FIG. 2, during a charging period "1", a current source 230 charges the PSM capacitor $C_3$ during pulse skipping mode operation, and during a charged period "2", the current source 230 is effectively replaced with a closed switch, thereby connecting the PSM capacitor $C_3$ to ground. A second controller 211 is shown in FIG. 2 for controlling the inclusion and current adjustment of the current source 230. While shown as a second controller 211, it is to be understood that at least some embodiments include the switching controller 210 and the controller 211 being a common or shared controller.

If, for example, a simple switch was used to connect the capacitor $C_3$ (that is, for example, connect $C_3$ to ground) during PSM operation, the output voltage would undergo a sudden change when the switch transitions from the OFF state to the ON state. The magnitude of the change would be dependent on the charge stored on the PSM capacitor $C_3$, which in turn depends on the past history of the system. In typical conditions this sudden disturbance can be as large as the largest recent change in the target output voltage, and will persist until the converter is able to restore regulation. In many applications, such large disturbances in output voltage are undesirable or unacceptable.

Figure 3A:
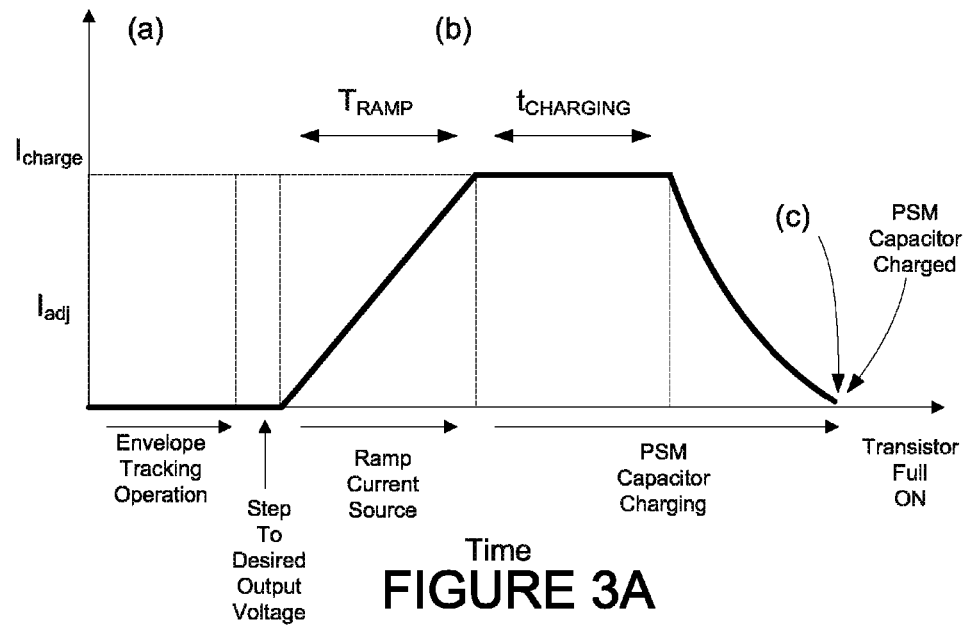
FIG. 3A shows an example of a waveform of a current source that charges a capacitor of a pulse skipping mode (PSM) of the voltage regulator of FIG. 2.
Figure 3B:
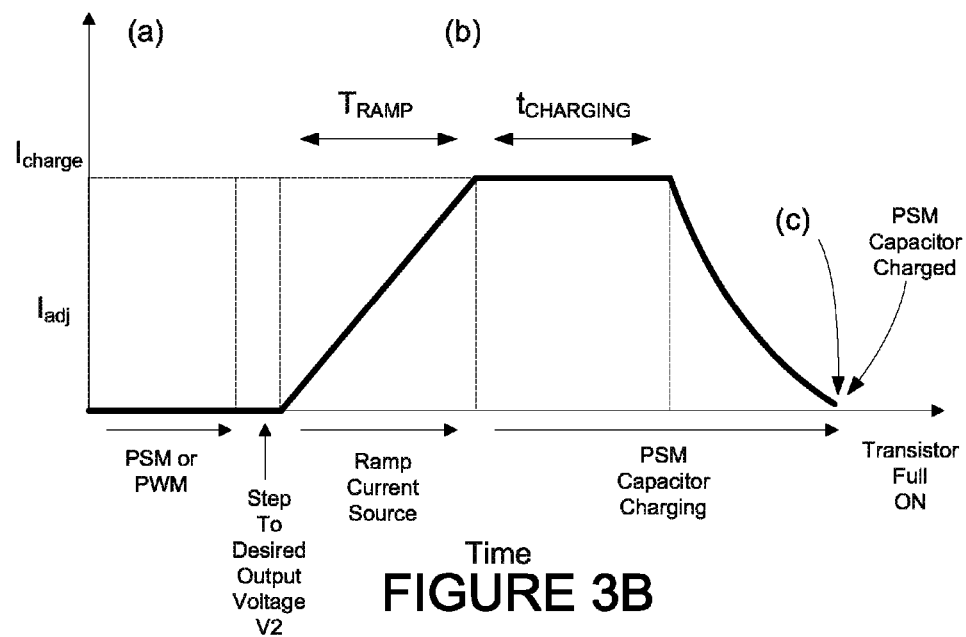
FIG. 3B shows an example of a waveform of a current source that charges a capacitor of a PSM or PWM (pulse width modulation) mode of the voltage regulator of FIG. 2 when transitioning from a first voltage to a second voltage.

Disturbances in the output voltage can be minimized by taking advantage of the fact that the PSM switch device (shown as a current source 230) can be implemented as a transistor is well-known that a transistor can be configured as a current source as long as the voltage applied to the drain (for an PET) or collector (for a BJT) is sufficient to ensure operation in the saturated region. A commonly-employed approach is to connect the gate or base of a large transistor to that of a smaller but otherwise identical transistor, through which a known small current is forced to pass. The current through the larger transistor is then proportional to the current through the small transistor; this arrangement is known as a current mirror. Other means may also be used. Thus, the switch transistor can be used as a ramped current source during the transition between an operating mode in which the PSM capacitor ($C_3$) is not connected (such as envelope tracking) and an operating mode in which it is connected. The output voltage may be rapidly stabilized at the target output value, and the PSM capacitor ($C_3$) can be controllably charged to that target output voltage, without unwanted disturbances in the output, FIG. 3A shows an example of a waveform of a current source that charges a capacitor of a pulse skipping mode (PSM) of the voltage regulator of FIG. 2. Initially, the voltage regulator is in an envelope tracking (mode (a)). In order to employ the current source 230, the converter continues to operate in pulse-width-modulated (PWM) mode during the process of charging the PSM capacitor (mode (b)). When envelope tracking operation terminates, rather than immediately turning on the PSM switch, embodiments are configured to provide a fixed current, and the current is ramped from 0 to a maximum value. It is to be understood that the currents depicted in FIG. 3A and 3B are averaged over the switching cycle of the series and shunt switches for clarity.

Referring to FIG. 3A, the rate at which the current source is ramped is set by the maximum disturbance allowed in the output voltage, typically established by the requirements of a given application, and the bandwidth of the PWM controller. A convenient estimate of the ramp rate may be obtained if the active output impedance of the converter as a function of frequency ω is known from measurement or simulation. Using an equivalent frequency $\omega_{eq} \approx 1/(t(ramp))$, the voltage disturbance $\delta V_{OUT}$ may be estimated as $$\delta V_{OUT} = |Z_{OUT}(\omega_{eq})| I_{CHARGE}$$

The ramp time and current level may be adjusted as needed to keep the disturbance within the predetermined bounds set by the application requirement. During the current source ramp and charging operations, the PSM switch absorbs the difference between the target output voltage and the voltage across the PSM capacitor. The output voltage is set by the charge state of $C_1$ and $C_2$, which are chosen to be small for envelope tracking operation. Therefore the output voltage may be readily adjusted as desired, independently of the time required to charge the PSM capacitor.

The magnitude of the current $I_{adj}$ is chosen to provide sufficiently fast charging response, for a given output capacitor $C_{PSM}$ (shown as $C_3$ in FIG. 2) and range of voltages $V_{OUT}$, to satisfy the requirements of a given application without exceeding the output current capacity of the converter. The time required is proportional to the difference between the initial voltage across the PSM capacitor and the target output voltage:

$$t_{CHARGE} < \frac{C_{PSM}(V_{PSMcap,start} - V_{OUT})}{I_{CHARGE}}$$

When the voltage across the PSM capacitor nears the output voltage, the current through the PSM switch transistor will fall as it enters linear operation. When the voltage across the PSM switch transistor is sufficiently close to 0, the PSM switch transistor can be set to turn fully on without further disturbance in the output voltage (mode (c)). The PSM capacitor is fully charged, and the converter may continue to operate in PWM mode, or may transition to PSM mode as previously described.

FIG. 3B shows an example of a waveform of a current source that charges a capacitor of a PSM or PWM (pulse width modulation) mode of the voltage regulator of FIG. 2 when transitioning from a first voltage to a second voltage. For this embodiment, the PSM capacitor is momentarily switched out when changing the regulated output voltage from the first value to the second value. Initially, the voltage regulator is in the PSM or the PWM (mode (a)). In order to employ the current source 230, the converter continues to operate in PSM or PWM mode during the process of charging the PSM/PWM capacitor (mode (b)). When stepping the regulated voltage from the first value to the second value, rather than immediately turning on the PSM switch, embodiments are configured to provide a fixed current, and the current is ramped from 0 to a maximum value. As previously stated, it is to be understood that the currents depicted in FIG. 3A and 3B are averaged over the switching cycle of the series and shunt switches for clarity.

Similar to the description of FIG. 3A, the rate at which the current source is ramped is set by the maximum disturbance allowed in the output voltage, typically established by the requirements of a given application, and the bandwidth of the PWM controller.

Figure 4:
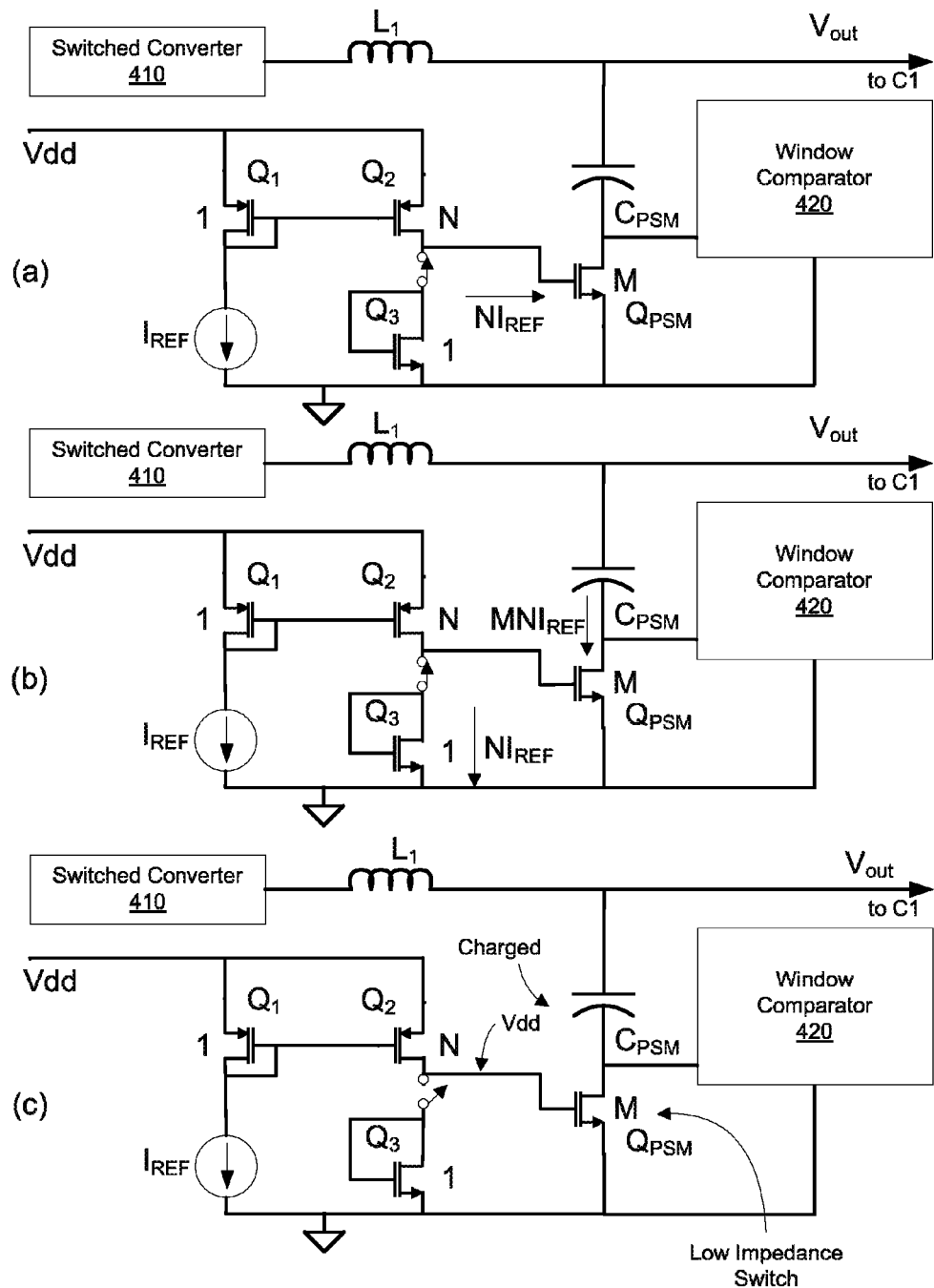
FIG. 4 shows a schematic of circuitry that can be utilized to control charging of the PSM capacitor of FIG. 2 according to an embodiment.

FIG. 4 shows a schematic of circuitry that can be utilized to control charging of the PSM capacitor ($C_3$) of FIG. 2 according to an embodiment. The three successive circuits reflect the three modes ((a)—ramping mode, (b)—current source mode, (c)—charged mode) shown in FIG. 3A. The capacitor $C_3$ of FIG. 2 is depicted as $C_{PSM}$ in FIG. 4. A first current mirror composed of transistors $Q_1$ and $Q_2$ provides a multiplied reference current $NI_{REF}$, which is initially directed to the gate of the PSM switch transistor $Q_{PSM}$, as shown in part (mode (a)) of FIG. 4. The magnitude of $NI_{REF}$ is chosen to provide the desired ramp time $t_{RAMP}$ for the known values of gate capacitance and threshold voltage of $Q_{PSM}$.

As the current through $Q_{PSM}$ increases, the scaled current through $Q_3$ also increases. By the end of $t_{RAMP}$, all the current from $Q_2$ is directed to $Q_3$, and the current through $Q_{PSM}$ is constant at the desired value of $MNI_{REF}$ (mode (b)) selected as noted above to provide suitable charging times without exceeding the ability of the Switched Converter 410 to source the requisite current. When the voltage on the bottom plate of the capacitor $C_{PSM}$ becomes sufficiently small to fail within the window range of a Window Comparator 420, the gate of $Q_{PSM}$ can be taken high to fully turn the FET on (mode (c)). The width of the comparator window is chosen to ensure that the resulting disturbance of the output voltage is acceptably small for the application.

When the transistor $Q_{PSM}$ is off, the bottom plate of the capacitor $C_{PSM}$ is floating, and follows changes in the output voltage. In particular, if the output voltage decreases substantially from that at which the PSM capacitor voltage was set, the instantaneous potential on the bottom plate of the capacitor may be lower than ground (less than 0). If the transistor $Q_{PSM}$ is implemented as an NMOS transistor, a negative voltage of magnitude greater than the diode forward voltage $V_f$ applied to the drain diffusion will cause it to become forward-biased if the well or body potential is held at ground. The forward-biased diode will rapidly discharge the PSM capacitor, temporarily clamping the output voltage. This is undesirable during envelope tracking operation. Therefore, when an MOS transistor is used, it must be placed in a well, and the well potential must be configured to be connected to either the drain or source side of the transistor, as required to avoid undesired forward bias of the source or drain diffusions.

Again referring to FIG. 2, embodiments include the controller determining whether the switching voltage regulator is switching from an envelope tracking mode to a non-envelope tracking mode. For a more specific embodiment, this includes the controller determining whether the switching voltage regulator is switching from an envelope tracking mode to a pulse skipping mode. For another embodiment, this includes the controller determining whether the switching voltage regulator is switching from a high-bandwidth mode to a low-bandwidth mode. For an embodiment, the selection of the settings of the switched output filter can be made as frequently as once per slot of a transmission protocol of a communications device utilizing the switching voltage regulator.

For some embodiments, the controller receives an indicator that the switching voltage regulator is switching from the envelope tracking mode to the pulse skipping mode. The mode can be selected, for example, by a controller of a mobile device in which the switching voltage regulator is located.

As previously described, embodiments of the switching output filter include a PSM capacitor, wherein the PSM capacitor is charged when the switching voltage regulator is determined to be switching from the envelope tracking mode to the pulse skipping mode. Specifically, the PSM capacitor is charged until a voltage on the PSM capacitor is approximately equal to an output voltage while maintaining a voltage ripple on the output voltage within a predetermined threshold.

Also as previously described, an embodiment of the switching voltage regulator includes a current source for charging the PSM capacitor when the switching voltage regulator is determined to be switching from the envelope tracking mode to the pulse skipping mode. The PSM capacitor is charged until the voltage on the PSM capacitor is set equal to the output voltage without undue disturbance of the output voltage. What is considered to be an undue disturbance is generally application specific, and set the maximum ripple on VOUT.

For at least some embodiments, a magnitude of current conducted or sourced by the current source comprises is ramped upon determining the switching voltage regulator is switching from the envelope tracking mode to the pulse skipping mode. As previously described, for an embodiment, the charging ramp (as shown in FIG. 3A) of the conducted current is chosen to provide sufficiently fast charging response, for a given output capacitor $C_{PSM}$ and range of voltages $V_{OUT}$ to satisfy the requirements of a given application without exceeding the output current capacity of the converter.

For an embodiment, when the transitioning from envelope tracking to non-envelope tracking is detected, settings of the switched output filter are incrementally adjusted to decrease a series resistance of a non-envelope tracking capacitance of the switched output filter. That is, as will be shown in FIG. 5, the large PSM capacitor is switched in with a series resistance that gradually decreases.

The described embodiments can be utilized for other purposes than switching of modes. More specifically, the described embodiments can more generally be used for rapidly switching a regulated voltage from one value to another value. For faster changes in a regulated output voltage, an embodiment includes switching out a PSM capacitor when changing the regulated output voltage from a first value to a second value. An embodiment further includes a current source for charging the capacitor C3 after the regulated output voltage has changed to the second value, wherein a magnitude of current conducted or sourced by the current source is ramped.

It should be noted that this embodiment includes a rapid change from the first value to the second value, and the previously described PSM mode is not applicable. For this embodiment, the large capacitor C3 is momentarily switched out of the configurable output filter to allow the rapid voltage change of the regulated voltage.

The rate of change of the regulated voltage can be dependent upon the application, and includes the time required to slew the envelope tracking capacitor(s) $C_2$ and optionally $C_3$ to the desired regulated output voltage. The described embodiments of multiple mode voltage regulators can be utilized in mobile devices. The mobile devices can utilize a wireless communication protocol such as WCDMA. Typically, the communication protocol includes slot boundaries wherein spurious signals that would be suppressed by the larger capacitor $C_3$ are not required to be suppressed. Therefore, the slot boundaries provide opportune times for rapidly changing the regulated output voltage, and temporary disconnection of the larger capacitor $C_3$. However, the change in the regulated output voltage should be completed within the time allotted by the slot boundary. The time improvement in stewing from the first voltage to the second voltage for a given maximum current of the voltage converter can be approximated by $(C3/(C1+C2))$, and can be selected by design within the constraints of the switching frequency.

Figure 5:
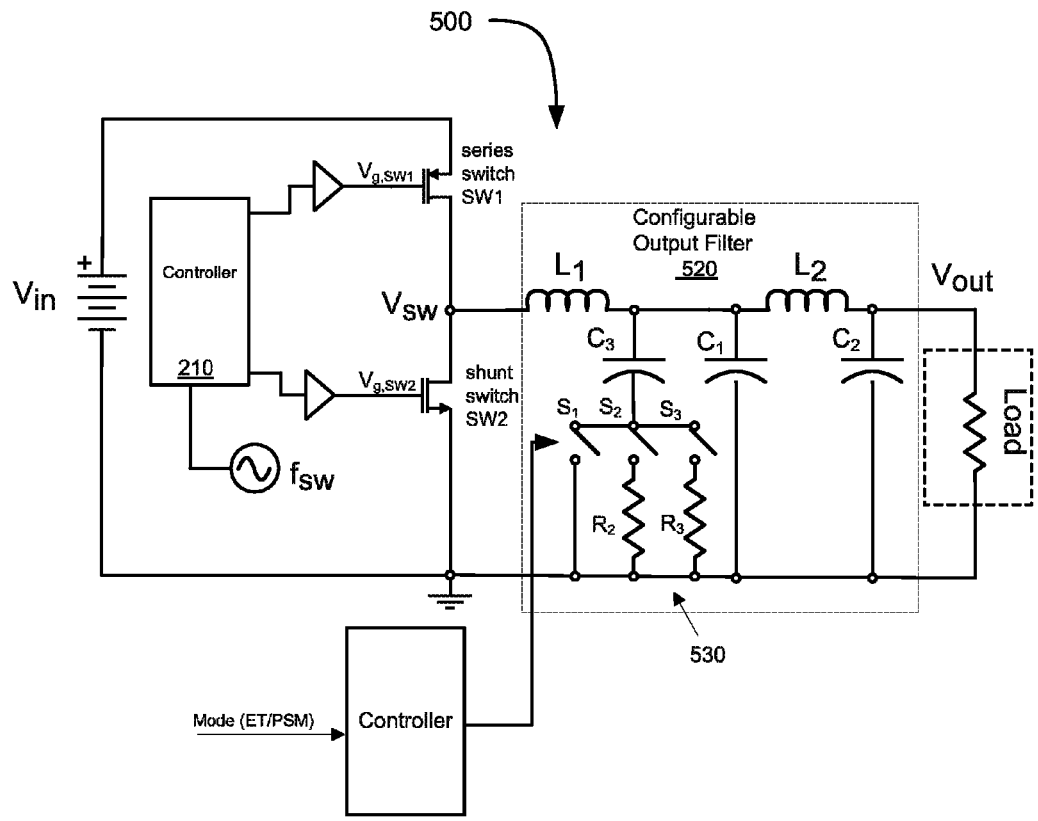
FIG. 5 shows an example of a multiple mode voltage regulator according to another embodiment.

FIG. 5 shows an example of a multiple mode voltage regulator according to another embodiment. This embodiment for charging the PSM capacitor with limited output disturbance employs a number of switches and varying series resistor values. Two or more switches are provided in parallel to connect the bottom plate of the PSM capacitor to ground, with varying values of resistance connected in series with some or all of the switches. The resistances act to limit the maximum charging current that can flow, and thus the maximum disturbance to the output voltage that can result. The embodiment depicted in Figure includes three switches, two with series resistors. To understand the operation of this circuit, first assume that all the switches are open, as shown, a configuration appropriate for envelope tracking operation. In order to transition to PSM or PWM operation with the PSM capacitor connected, as a first step, switch $S_3$ is closed, connecting resistor $R_3$ between the bottom place of $C_{PSM}$ and ground. Resistor $R_3$ is presumed here to be a large value, such as 50 ohms, resulting in a small change in the output voltage when the switch is closed. Once the PSM capacitor is partially charged, switch $S_2$ is closed. The resistor $R_2$ is a smaller value than $R_3$, such as 25 ohms. The relative values of the resistors are chosen to correspond to the remaining charge on $C_{PSM}$ when they are switched into the circuit, so that each switching event produces an acceptably small disturbance in $V_{out}$. In the example shown in the figure, once the voltage on $C_{PSM}$ is smaller than the maximum allowed output disturbance, switch $S_1$ is closed, and the bottom plate of the PSM capacitor is tied to ground.

Presuming that the closure of each switch is fast relative to the response time of the converter, the disturbance in output voltage at each switch event is approximately equal to the ratio of the equivalent open-loop resistance of the converter to the series resistance, multiplied by the voltage across the PSM capacitor at the moment the switch is closed:

$$\delta V_{out,SWn} = R_{CONV} \delta G_n V_{CPSM}$$

where n is the identifier for the switch being closed, and $\delta G_n$ is the change in conductance presented to the bottom plate of the PSM capacitor when switch n is closed. For example, let us assume the largest output disturbance allowable is 40 mV. If the converter appears to have an open-loop output resistance of 1 ohm, the values of $R_1$ and $R_2$ are respectively 50 and 35 ohms, and 2 volts are initially present across the PSM capacitor, the first step will be $$\delta V_{out,SW3} = 1\left(\frac{1}{50}\right)2 \approx 40 \text{ mV}$$

The closed-loop response of the regulator will compensate for this disturbance after a response time, returning the output voltage to the regulated target value. If the voltage across the capacitor has fallen to 1 V at the time of the next step, the output voltage disturbance will be:

$$\delta V_{out,SW2} = 1\left(\left[\frac{1}{25} + \frac{1}{50}\right] - \frac{1}{50}\right)1 = 40 \text{ mV}$$

The voltage on the PSM capacitor is then allowed to fall to 40 mV, after which $S_1$ is closed and the process is complete. The total time required is determined by the RC time constants of the various configurations, and the extent to which each step must discharge the initial voltage. More stages of resistors may be added to reduce the total time required to charge the PSM capacitor, if required by the envisioned application.

As noted above, if the switches $S_1$, $S_2$, and so on, are implemented as MOS devices, it may be necessary to account for the possibility of polarity inversion in establishing the body voltages, to avoid unintended forward-biased junctions.

The PSM capacitor charging mechanism can also be used in the case where the target output voltage of a converter needs to be rapidly changed at infrequent intervals, and remains constant between those intervals. The PSM capacitor is connected to the output in constant-voltage operation. When a change in target output voltage is required, the PSM capacitor is disconnected by opening the PSM switch or switches, and a new target output voltage is provided to the converter. Since the PSM capacitor is not connected, the converter needs only to charge the remaining capacitances, such as $C_1$ and $C_2$ in FIG. 2, where these capacitances have been chosen to allow rapid changes in the output voltage as described previously. The total amount of charge required is greatly reduced from that used to change the output voltage of the larger $C_{PSM}$, so the output voltage can be rapidly stabilized at the new value. After the new target output voltage is reached, the PSM capacitor charging operation described above can be performed. At the end of the procedure, the PSM capacitor is again connected to the output voltage, and the output voltage level has remained substantially constant at the new target value.

Figure 6:
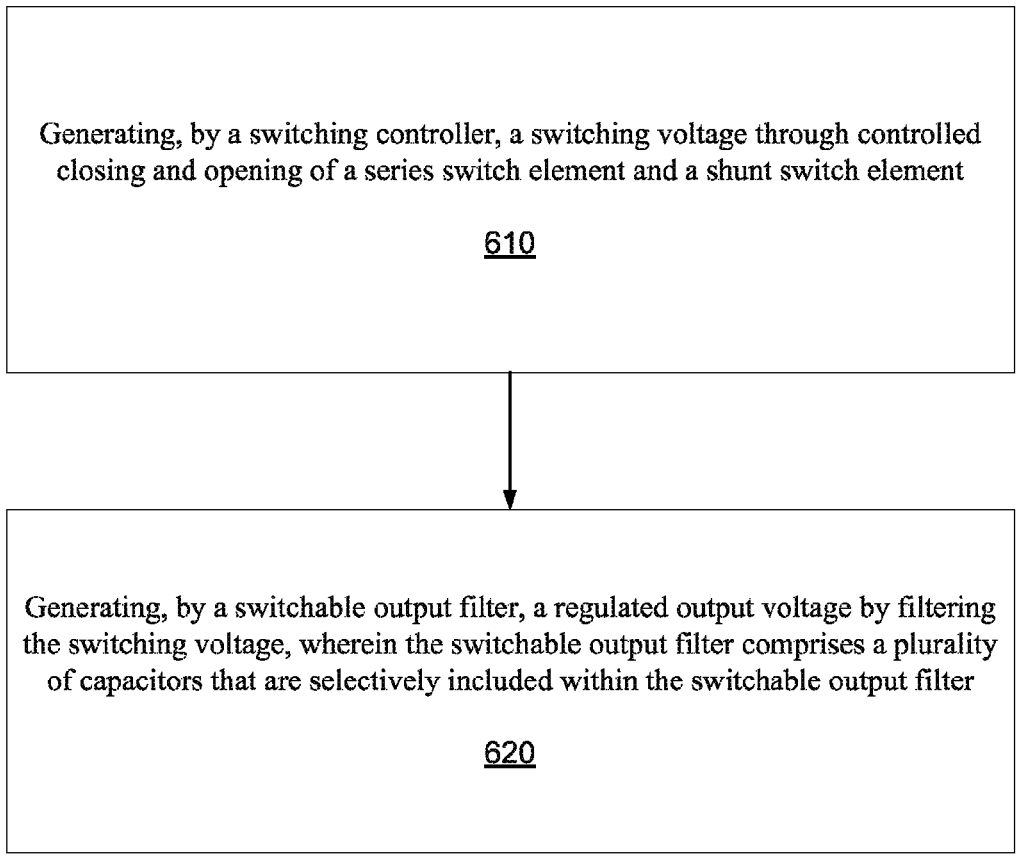
FIG. 6 is a flow chart that includes steps of a method of operating a multiple mode voltage regulator according to an embodiment.

FIG. 6 is a flow chart that includes steps of a method of operating a multiple mode voltage regulator according to an embodiment. A first step 610 includes generating, by a switching controller, a switching voltage through controlled closing and opening of a series switch element and a shunt switch element. A second step 620 includes generating, by a switchable output filter, a regulated output voltage by filtering the switching voltage, wherein the switchable output filter comprises a plurality of capacitors that are selectively included within the switchable output filter.

As described, embodiments include determining whether the switching voltage regulator is switching from an envelope tracking mode (high-bandwidth mode) to a non-envelope tracking mode (low-bandwidth mode).

As described, embodiments include the switching voltage regulator receiving an indicator that the switching voltage regulator is switching from the envelope tracking mode to the non-envelope tracking mode.

As described, embodiments include switchable output filter including a PSM capacitor, and further includes charging the PSM capacitor when the switching voltage regulator is determined to be switching from the envelope tracking mode to the non-envelope tracking mode.

As described, for embodiments a magnitude of current conducted or sourced by the current source comprises ramping the value of the current source upon determining the switching voltage regulator is switching from the envelope tracking mode to the non-envelope tracking mode.

As described, embodiments include selecting one of two or more switched output filter settings. For a specific embodiment, the settings of the switchable output filter are selected as frequently as once per slot of a transmission protocol of a communications device utilizing the switching voltage regulator.

At least some embodiments include switching out a PSM capacitor when changing the regulated output voltage from a first value to a second value, until a desired regulated output voltage is obtained. More specifically, an embodiment includes charging the PSM capacitor with a current source after the regulated output voltage has changed to the second value, wherein a magnitude of current conducted or sourced by the current source is ramped.

Figure 7:
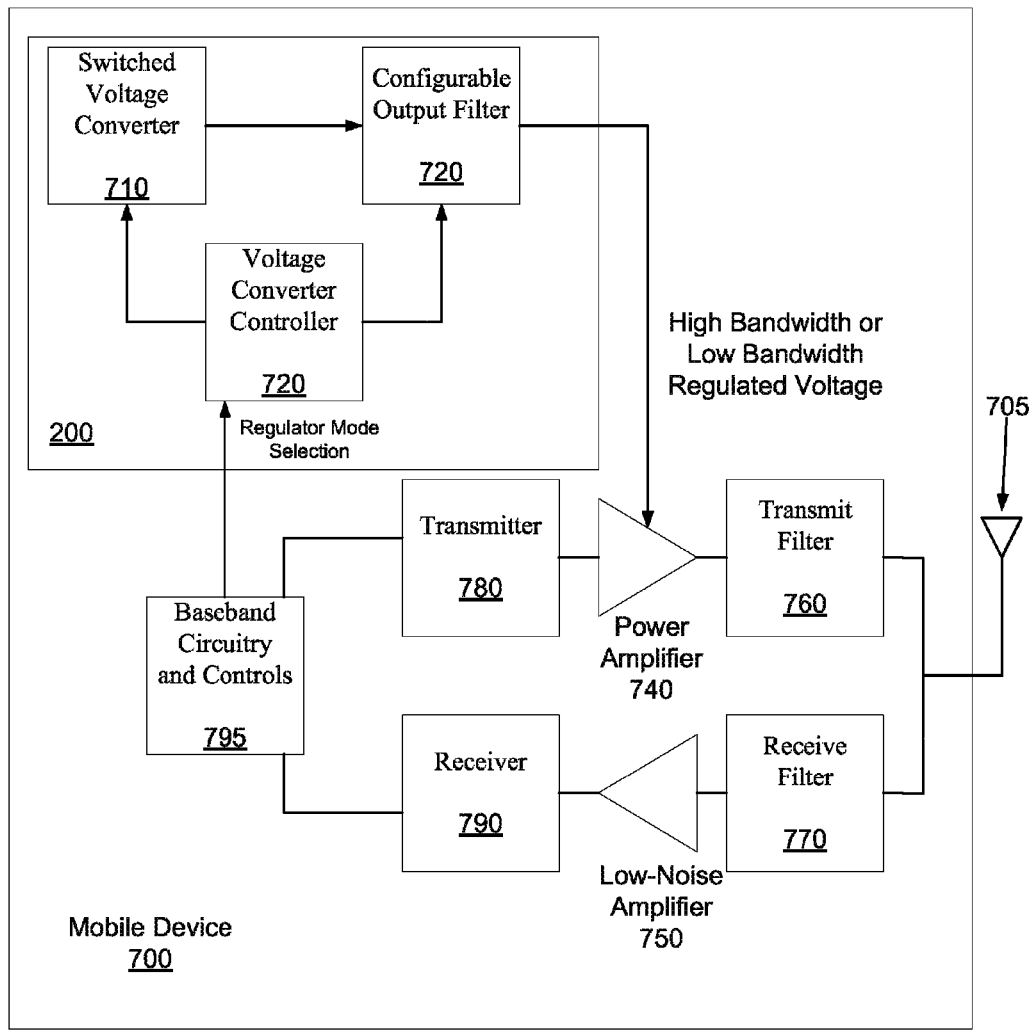
FIG. 7 is a block diagram of a mobile device that includes a power amplifier that is connected to a multiple mode voltage regulator according to at least one of the described embodiments.

FIG. 7 is a block diagram of a mobile device 700 that includes a power amplifier 740 that is connected to a multiple mode voltage regulator 200 according to at least one of the described embodiments. As shown, the mobile device 700 also includes an antenna 705, a transmitter 780, a transmit filter 760, a receive filter 770, a tow noise amplifier (LNA) 750, a receiver 790, and base-band circuitry and controls 795. As shown, the base-band circuitry and controls 795 provides a mode selection for the multiple mode voltage regulator 200. For an embodiment, the selection is based on whether the multiple mode voltage regulator 200 is to operate in a high bandwidth mode (for example, an envelope tracking (ET) mode) or in a low bandwidth mode (for example, the pulse skipping (PS) mode).

Similar to previously described embodiments, the multiple mode voltage regulator 200 includes a voltage converter 710 that includes a series switch element, a shunt switch element, and a switching controller configured to generate a switching voltage through controlled closing and opening of the series switch element and the shunt switch element. The multiple mode voltage regulator 200 further includes a configurable output filter 720 (that is, the switched output filter) for filtering the switching voltage and generating a regulated output voltage, wherein the configurable output filter 720 includes a plurality of capacitors that are selectively included within the configurable output filter. A voltage converter controller 720 (which can also include the switching controller) of the multiple mode voltage regulator 200 receives the mode selection from the base-band circuitry and controls 795, and selects the settings of the configurable output filter 720 accordingly. The multiple mode voltage regulator 200 then provides the high or low bandwidth regulated voltage to the power amplifier 740 accordingly.

Although the disclosed embodiments have been described in the context of changes in converter operating modes, a configurable output filter may also be employed when the operating mode of the converter is unchanged, but the detailed requirements upon the output change. For example, a configurable output filter can provide the ability to switch between two or more output bandwidths, by adjusting the capacitance presented to the output side of the inductor. Adjustable output bandwidth is beneficial in cases where the input bandwidth may not be constant; for example, when envelope tracking is used in the Long-Term Evolution (LTE) wireless standard, in which the bandwidth of the transmitted RF signal may vary depending on the number of resource blocks allocated to a given transmitter. In such cases, where the change in output capacitance is modest, it may not be necessary to make provisions for controlled transition from one capacitance state to another, as described above.

Although specific embodiments have been described and illustrated, the embodiments are not to be limited to the specific forms or arrangements of parts so described and illustrated.

The invention claimed is:

1. A switching voltage regulator, comprising:
   a series switch element;
   a shunt switch element;
   a switching controller configured to generate a switching voltage through controlled closing and opening of the series switch element and the shunt switch element;
   a switched output filter for filtering the switching voltage and generating a regulated output voltage, wherein the switched output filter comprises a plurality of capacitors that are selectively included within the switched output filter, wherein the plurality of capacitors includes at least a pulse skipping mode (PSM) capacitor; and a controllable current source connected in series with the PSM capacitor, wherein substantially all of a current provided by the controllable current source flows through the PSM capacitor, and wherein the controllable current source is operative to charge the PSM capacitor when the switching voltage regulator is determined to be switching from an envelope tracking mode to a pulse skipping mode.

2. The switching voltage regulator of claim 1, further comprising determining whether the switching voltage regulator is switching from the envelope tracking mode to a non-envelope tracking mode.

3. The switching voltage regulator of claim 1, wherein the switching voltage regulator receives an indicator that the switching voltage regulator is switching from the envelope tracking mode to the pulse skipping mode.

4. The switching voltage regulator of claim 1, wherein the PSM capacitor is charged until a voltage on the PSM capacitor is approximately equal to an output voltage while maintaining a voltage ripple on the output voltage within a predetermined threshold.

5. The switching voltage regulator of claim 4, further comprising ramping a magnitude of current conducted or sourced by the controllable current source upon determining the switching voltage regulator is switching from the envelope tracking mode to the pulse skipping mode.

6. The switching voltage regulator of claim 1, further comprising a controller operative to control selection of two or more switched output filter settings.

7. The switching voltage regulator of claim 6, wherein when transitioning from envelope tracking to non-envelope tracking, settings of the switched output filter incrementally decrease a series resistance of a non-envelope tracking capacitance of the switched output filter.

8. The switching voltage regulator of claim 1, wherein selection of the settings of the switched output filter can be made as frequently as once per slot of a transmission protocol of a communications device utilizing the switching voltage regulator.

9. The switching voltage regulator of claim 1, further comprising switching out the PSM capacitor when changing the regulated output voltage from a first value to a second value.

10. The switching voltage regulator of claim 9, wherein the controllable current source charges the PSM capacitor after the regulated output voltage has changed to the second value.

11. The switching voltage regulator of claim 1, further comprising the controllable current source being connected between a bottom plate of the PSM capacitor and a local ground.

12. The switching voltage regulator of claim 1, further comprising the controllable current source being connected between a top plate of the PSM capacitor and an output side of an output inductor.

13. The switching voltage regulator of claim 1, wherein the current source comprises a transistor that provides a ramped current, wherein substantially all the ramped current flows through the PSM capacitor while charging the PSM capacitor.

14. A method of operating a voltage regulator, comprising:
generating, by a switching controller, a switching voltage through controlled closing and opening of a series switch element and a shunt switch element;
generating, by a switchable output filter, a regulated output voltage by filtering the switching voltage, wherein the switchable output filter comprises a plurality of capacitors that are selectively included within the switchable output filter, wherein the plurality of capacitors includes at least a pulse skipping mode (PSM) capacitor; and charging the PSM capacitor with a controllable current source when the switching voltage regulator is determined to be switching from an envelope tracking mode to a pulse skipping mode, wherein the controllable current source is connected in series with the PSM capacitor, and wherein substantially all of a current provided by the controllable current source flows through the PSM capacitor.

15. The method of claim 14, further comprising determining whether the switching voltage regulator is switching from the envelope tracking mode to a non-envelope tracking mode.

16. The method of claim 15, wherein the switching voltage regulator receives an indicator that the switching voltage regulator is switching from the envelope tracking mode to the non-envelope tracking mode.

17. The method of claim 15, wherein a magnitude of current conducted or sourced by the controllable current source comprises ramping the value of the controllable current source upon determining the switching voltage regulator is switching from the envelope tracking mode to the non-envelope tracking mode.

18. The method of claim 14, further comprising selecting one of two or more switched output filter settings.

19. The method of claim 14, wherein selecting the settings of the switchable output filter can be made as frequently as once per slot of a transmission protocol of a communications device utilizing the switching voltage regulator.

20. The method of claim 14, further comprising switching out the PSM capacitor when changing the regulated output voltage from a first value to a second value, until a desired regulated output voltage is obtained.

21. The method of claim 20, further comprising charging the PSM capacitor with the controllable current source after the regulated output voltage has changed to the second value.

22. A mobile device, comprising:
a transmitter for transmitting communications signals;
a power amplifier for amplifying the communications signals before transmission;
a multiple mode switching voltage regulator for providing a regulated voltage to the power amplifier, the multiple mode switching voltage regulator, comprising;
a series switch element;
a shunt switch element;
a switching controller configured to generate a switching voltage through controlled closing and opening of the series switch element and the shunt switch element;
a switched output filter for filtering the switching voltage and generating a regulated output voltage, wherein the switched output filter comprises a plurality of capacitors that are selectively included within the switched output filter, wherein the plurality of capacitors includes at least a pulse skipping mode (PSM) capacitor; and
a controllable current source connected in series with the PSM capacitor, wherein substantially all of a current provided by the controllable current source flows through the PSM capacitor, and wherein the controllable current source is operative to charge the PSM capacitor when the switching voltage regulator is determined to be switching from an envelope tracking mode to a pulse skipping mode.

23. A switching voltage regulator, comprising:
a series switch element;

a shunt switch element;
a switching controller configured to generate a switching voltage through controlled closing and opening of the series switch element and the shunt switch element;
a switched output filter for filtering the switching voltage and generating a regulated output voltage, wherein the switched output filter comprises a plurality of capacitors that are selectively included within the switched output filter, wherein the plurality of capacitors includes at least a pulse skipping mode (PSM) capacitor; and
a controllable current source connected in series with the PSM capacitor, wherein the controllable current source is operative to charge the PSM capacitor when the switching voltage regulator is determined to be switching from an envelope tracking mode to a pulse skipping mode; wherein
a PSM switch is opened while the controllable current source is charging the PSM capacitor with a ramped current, wherein substantially all of the ramped current flows through the PSM capacitor when the PSM switch is open, and wherein the PSM switch absorbs a difference between a target output voltage and a voltage across the PSM capacitor.

* * * * *